United States Patent Office 3,285,842
Patented Nov. 15, 1966

---

3,285,842
PROCESS OF MAKING DIOXYGEN CHLORINE TRIFLUORIDE
Aristid V. Grosse and Alex G. Streng, Philadelphia, Pa., assignors, by mesne assignments, to the United States of America as represented by the Secretary of the Navy
No Drawing. Filed Mar. 22, 1963, Ser. No. 267,370
6 Claims. (Cl. 204—157.1)

The invention described herein may be manufactured and used by or for the Government of the United States of America for governmental purposes without the payment of any royalties thereon or therefor.

This invention relates to dioxygen chlorine trifluoride, and particularly to a method of synthesizing the same.

Solid-propellant technology, with few exceptions, is based on the oxidation of hydrogen and carbon atoms by a high energy oxidizer. Dioxygen chlorine trifluoride is a high energy oxidizer which, due to its activity, may be used to oxidize such things as fuel.

An object of this invention is to provide a novel process of synthesizing dioxygen chlorine trifluoride which has a remarkable oxidizing power even at low temperatures.

Other objects and many of the attendant advantages of this invention will be readily appreciated as the same become better understood by reference to the following description.

The process of this invention comprises irradiating chlorine trifluoride with ultraviolet light while in contact with an oxygen atmosphere under pressure.

Example

Pure liquid chlorine trifluoride was placed in a quartz tube embedded in a Dry Ice cavity and maintained at a temperature of 195° K. Oxygen was admitted into the atmosphere surrounding the fluoride compound until a pressure of about 2 atmospheres was attained, at which time, the fluoride compound was irradiated with ultraviolet light having a wavelength ($\lambda$) of 2537 A. and an intensity of 7 microwatts (mw.) per square centimeter. In a short time, a violet compound was produced in line with the equation:

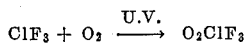

$$ClF_3 + O_2 \xrightarrow{U.V.} O_2ClF_3$$

The process as set forth may be modified within limits. In illustration, the temperature of the reaction may vary from about 195° K. to 200° K. If the process is carried out above 200° K., the dioxygen chlorine trifluoride will decompose, while if the process is carried out below 195° K., the chlorine trifluoride (starting material) will probably solidify and it will become difficult, if not impossible, to synthesize the desired compound in accordance with the process as taught.

Latitude is also allowable with respect to the range of pressure under which the process will operate in a satisfactory manner. It has been found that the process will operate at pressure in excess of 1.5 atmospheres, the strength of the apparatus in the system representing the limiting factor in the process. If the pressure of the system falls below 1.5 atmospheres during processing, the product will readily decompose. The process is preferably carried out between about 1.5 and 2.0 atmospheres.

With respect to the intensity of the irradiating source, it has been found that it may be between about 4.5 to 9.5 microwatts (mw.) per square centimeter. When the intensity of the irradiating source is about 9.5 mw., the dioxygen chlorine trifluoride produced during processing will readily decompose. However, if the intensity of the ultraviolet light source is below 4.5 mw., very little, if any, dioxygen chlorine trifluoride will form.

It is apparent from the foregoing description that we have invented a novel process of synthesizing dioxygen chlorine trifluoride. Obviously, many modifications and variations of the present discovery will become apparent to one skilled in the art in view of the above teaching, so that it is to be understood that this invention, as set forth in the appended claims, may be practiced otherwise than as described.

We claim:
1. A process of synthesizing dioxygen chlorine trifluoride comprising
   irradiating chlorine trifluoride with ultraviolet light having an intensity between 4.5 to 9.5 microwatts per square centimeter,
      said chlorine trifluoride being maintained at a temperature between about 195° K. to 200° K. in contact with an oxygen atmosphere under a pressure above 1.5 atmospheres.
2. A process of synthesizing dioxygen chlorine trifluoride comprising
   irradiating chlorine trifluoride with ultraviolet light having an intensity between 4.5 to 9.5 microwatts per square centimeter,
      said chlorine trifluoride being maintained at a temperature between about 195° K. to 200° K. in contact with an oxygen atmosphere under a pressure of 2 atmospheres.
3. A process of synthesizing dioxygen chlorine trifluoride comprising
   irradiating chlorine trifluoride with ultraviolet light having a wavelength of 2537 A. and an intensity between 4.5 to 9.5 microwatts per square centimeter,
      said chlorine trifluoride being maintained at a temperature between about 195° K. to 200° K. in contact with an oxygen atmosphere under a pressure above 1.5 atmospheres.
4. A process of synthesizing dioxygen chlorine trifluoride comprising
   irradiating chlorine trifluoride with ultraviolet light having a wavelength of 2537 A. and an intensity of 7 microwatts per square centimeter,
      said chlorine trifluoride being maintained at a temperature between about 195° K. to 200° K. in contact with an oxygen atmosphere under a pressure above 1.5 atmospheres.
5. A process of synthesizing dioxygen chlorine trifluoride comprising
   irradiating chlorine trifluoride with ultraviolet light having a wavelength of 2537 A. and an intensity of 7 microwatts per square centimeter,
      said chlorine trifluoride being maintained at a temperature between about 195° K. to 200° K. in contact with an oxygen atmosphere under a pressure of about 2 atmospheres.
6. A process of synthesizing dioxygen chlorine trifluoride comprising
   irradiating chlorine trifluoride with ultraviolet light having a wavelength of 2537 A. and an intensity of 7 microwatts per square centimeter,
      said chlorine trifluoride being maintained at a temperature of 200° K. in contact with an oxygen atmosphere under a pressure of 2 atmospheres.

No references cited.

JOHN H. MACK, *Primary Examiner.*

H. S. WILLIAMS, *Assistant Examiner.*